Nov. 1, 1938.  H. H. OFFUTT  2,134,950
GRAPHITIZED CARBON BLACK
Original Filed Aug. 20, 1934
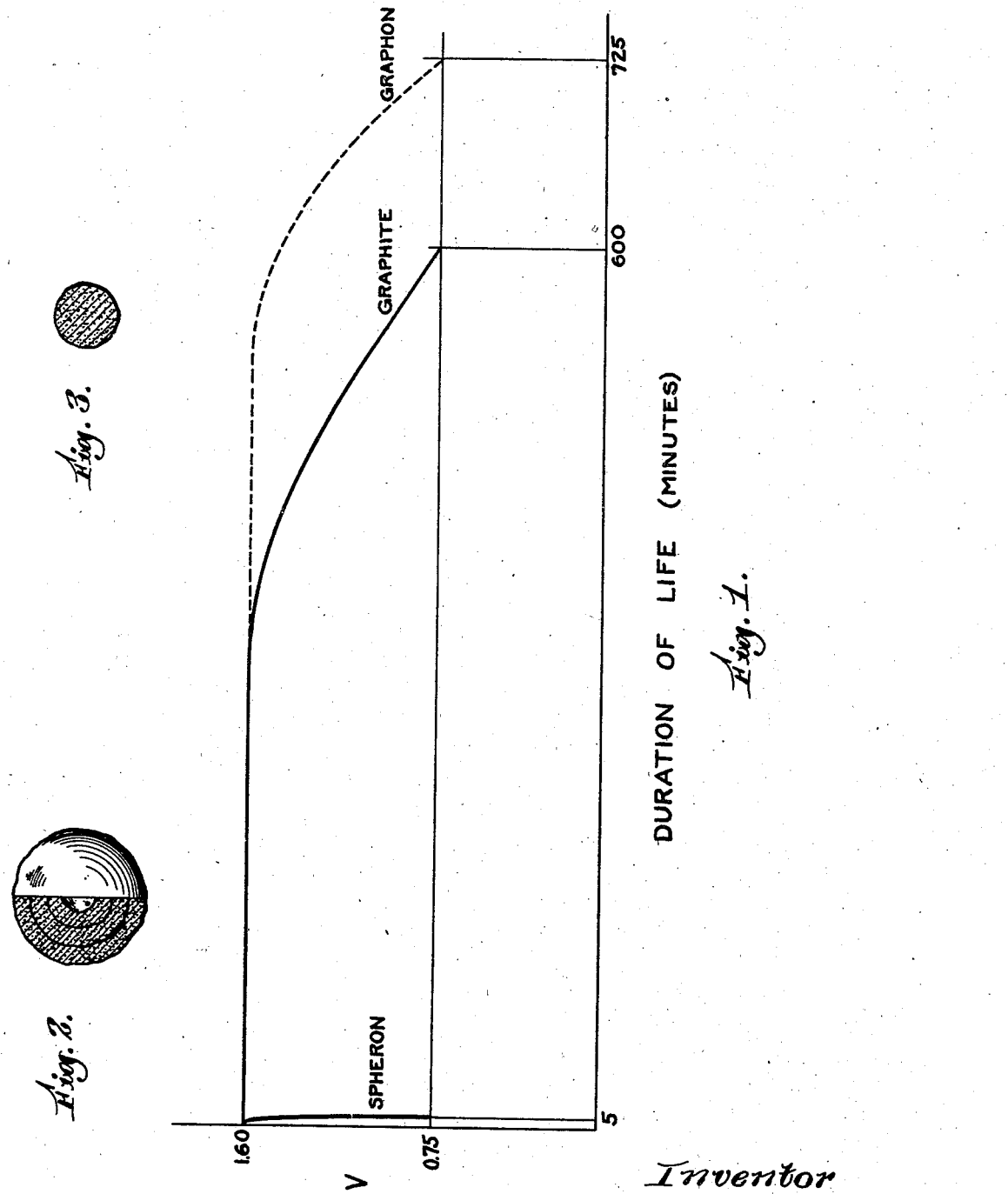

Patented Nov. 1, 1938

2,134,950

UNITED STATES PATENT OFFICE 2,134,950

GRAPHITIZED CARBON BLACK

Harold H. Offutt, Winchester, Mass., assignor to Godfrey L. Cabot, Inc., Boston, Mass., a corporation of Massachusetts Application August 20, 1934, Serial No. 740,661
Renewed November 3, 1936

15 Claims. (Cl. 23—209)

This invention relates to a novel material or product of manufacture comprising graphitized carbon black in the form of relatively dense, free-flowing granules. It includes within its scope a novel process of producing graphitized carbon black in this form from the flocculent carbon black of commerce.

One important field of use of my invention is in connection with flocculent carbon black made by the so-called channel or impingement process, in which natural gas is burned against metallic surfaces. As first produced, such carbon black has an apparent density in bulk of about four pounds per cubic foot. It has been the practice to increase this apparent density in bulk to about twelve pounds per cubic foot by stirring, and then to increase it further by compressing in packages. The resulting compressed carbon black of commerce, on account of its dusty nature and bulk is still inconvenient to handle and process. Attempts have been made to graphitize such carbon black by subjecting it to intense heat in crucibles but heretofore the dust nuisance and bulky effect of handling carbon black in this form has rendered it impractical from a commercial standpoint. Indeed the difficulties of graphitizing commercial compressed carbon black have been so great that organizations having the crucible equipment and necessary electrical energy available have declined to attempt carrying out the process.

I have discovered that carbon black may be successfully graphitized and all the difficulties of handling flocculent carbon black successfully avoided by first converting the carbon black to granular form, that is, into the form of hard, dense, dustless aggregates, and then converting this granular material, a step product, to a graphitized form by heating the same in crucibles. One possible theory for accounting for this hitherto unknown property of granular carbon black, viz., its adaptability to graphitizing, is that in this form it may release its entrained air or gases more readily and completely than does carbon black in flocculent form and that the graphitizing operation is facilitated or expedited by such separation.

I prefer to convert compressed or flocculent carbon black into the form commercially known as "Spheron", that is, into substantially spherical granules, or fragments thereof, of the type disclosed in U. S. Patent No. 1,957,314, granted May 1, 1934 on an application of Billings and Offutt. Carbon black in this form presents the advantage of free flow, relatively high density, dustlessness and convenience in handling to such an extent that it may be transported in tank cars and caused to flow through pipes. It may thus be conveniently delivered to and withdrawn from the crucibles in which it is subjected to the graphitizing process. While I prefer to utilize the material, "Spheron" as a step product in carrying out my invention, I do not wish to limit myself in this respect but contemplate the graphitizing of granular carbon black of suitable characteristics however produced.

The product of my invention, viz., graphitized carbon black in granular form, has valuable properties in various uses. For example, it forms a valuable ingredient of the cathodes of dry batteries. This is usually a carbon-manganese dioxide mixture in which the carbon serves as a conductor and the manganese dioxide as a depolarizer. In such batteries, the carbon rod may be considered as a collector of current from the carbon-manganese dioxide mixture. Granulated carbon, carbon black, graphite and impalpable graphite have all been used at times in the manufacture of dry batteries. It has been found that graphitized carbon black in granular form, and particularly graphitized "Spheron", commercially known as "Graphon", is an ingredient of particularly and unexpectedly great value in the construction of dry batteries for which graphitized flocculent carbon black is not convenient to use.

In the accompanying drawing,—

Fig. 1 is a chart whereon are depicted the efficiency curves of dry batteries employing graphitized carbon black and other cathode materials;

Fig. 2 is a view, greatly magnified, showing a carbon black granule of spherical shell structure, partly in section and partly in elevation; and Fig. 3 is a sectional view of a homogeneous granule of carbon black.

In preparing "Graphon" or graphitized "Spheron" for use in dry batteries or otherwise, the flocculent carbon black of commerce may be treated in accordance with the disclosure of U. S. Patent No. 1,957,314, above referred to. That is to say, the flocculent carbon black, compressed or otherwise, is subjected to turbulent agitation in a dry state, preferably in the presence of a priming charge of fine granular material. The impact-generated cohesion of the carbon black particles causes agglomeration of the flocculent carbon black in dense, dustless, free flowing, non-adherent granules, presenting more or less surface polish and of sufficient tenacity of structure to withstand handling in bulk without disintegration. When a priming charge is used, the resulting granules are of concentric shell structure, as shown in Fig. 2. It is possible, however, to produce homogeneous granules of the character shown in Fig. 3, though usually less convenient to do so under commercial conditions.

The "Spheron" thus produced, comprising spherical granules from 300-mesh to 20-mesh in diameter and having a density of more than 12 pounds per cubic foot, for example from 18 to 30 pounds per cubic foot, is then placed in a crucible of suitable size and shape,—for example, one 16 feet long, having a depth of 4 feet and a width of 4 feet. The crucible and its contents are then heated gradually by electric energy to a temperature of about 2000° C., substantially out of contact with air, maintained at such temperature for a period of perhaps a week, and then gradually cooled. The time required to bring such a charge up to the requisite temperature may be perhaps six or seven days, and the time required for cooling may be the same interval, so that the graphitizing step of my improved process may consume as much as three weeks for its completion. At the conclusion of this step, it will be found that the granular carbon black, which beforehand showed only traces of crystalline structure, has now been more or less completely converted to a graphitic state, although there has otherwise been no substantial change in the shape of the granules or in their apparent density.

That there has been a change in the nature or the physical structure of the carbon black is apparent from the behavior of the graphitized material, or "Graphon", in a dry battery as compared to the behavior of the ungraphitized "Spheron", as shown in the accompanying chart. Moreover, the novel product of my invention, when subjected to an X-ray test, displays a very distinct six-ring structure, whereas a similar test of the ungraphitized material exhibits a less distinct six-ring structure. That the carbon black has been at least partially converted to a graphitic form may also be demonstrated by chemical test. When "Graphon" produced as above outlined is treated with fuming nitric acid and potassium chlorate on a water bath, a pale yellow solution is obtained which, on filtering and evaporating, crystallizes into colorless crystals the majority of which visibly differ from those obtained when ungraphitized carbon black is so treated.

I have specifically mentioned "Spheron" produced by mechanical manipulation in a dry state as the step product which I prefer to employ in manufacturing the novel graphitized carbon black product of my invention. I am well aware, however, that granules of carbon black may be produced from the flocculent material by various processes involving the use of one or more liquids. Granules so produced are satisfactory material for the purposes of my invention and are included within its scope.

As already intimated, an important field of use of the graphitized granular carbon black of my invention is in connection with the manufacture of dry batteries. The efficiency curves of Fig. 1 represent voltage and duration of life of three batteries, otherwise identical, but having equal amounts of "Spheron", graphite, and "Graphon" included in their cathode material.

Referring to this chart, the ordinates of the various curves represent the voltage of the battery while the abscissa represents the life of the battery in terms of minutes. It will be noted that the battery made with "Spheron" gives a potential of 1.60 volts but that its potential drops in five minutes to a 0.75 volt end point. The battery made with graphite gives an initial potential of 1.60 volts, maintains its potential for a long period, and drops off at a rather slow rate to an end point of 0.75 volt in 600 minutes. On the other hand, the battery made with "Graphon" gives the same initial potential which is maintained for a substantially longer period, and then drops off gradually to an end point of 0.75 volt at an interval very much longer than the life of any of the other batteries, viz., in about 725 minutes, indicating an increase in life of more than twenty percent over the graphite battery. These curves, therefore, indicate comparatively the greater value of my new product in the dry battery field and its value in other fields will be apparent to those skilled in the art.

Having thus described my invention, what I claim as new and desire to secure by Letters Patent is:

1. As a new product of manufacture, graphitized carbon black in the form of spherical granules having a relatively tenacious internal structure consisting of concentric shells of progressively increasing diameters bonded together with sufficient tenacity to withstand transportation in bulk without disintegration, the granules presenting polished exterior surfaces and having an apparent density in bulk of more than 12 pounds per cubic foot.

2. As a new product of manufacture, graphitized carbon black in the form of spherical granules comprising in internal structure a central core with a plurality of concentric spherical shells enclosing the same and united to each other with sufficient tenacity to withstand disintegration when transported in bulk, the granules presenting smooth, non-adherent exterior surfaces and having an apparent density in bulk of at least 18 pounds per cubic foot.

3. As a manufactured product, graphitized carbon black in the form of spherical granules between 300 mesh and 20 mesh in diameter, of more than 12 pounds per cubic foot in apparent density and each comprising a dense compact core surrounded by a spherical shell of substantially the same density as the core and built up progressively upon the core by the application of turbulent pressure to flocculent carbon black with sufficient cohesiveness to maintain its identity and adapt the granules to withstand disintegration when transported in bulk and presenting a smooth, non-adherent exterior surface.

4. As a manufactured product, graphitized carbon black in the form of spherical granules each comprising an integral coherent core surrounded by a series of concentric shells of substantially equal density, each sufficiently cohesive to maintain its identity when the granule is cut in cross section, presenting a spherical exterior light-reflecting surface and being tenaciously bonded with the core sufficiently to withstand disintegration when transported in bulk.

5. A new product of manufacture, consisting of graphitized carbon black in the form of solid spherical granules between 300 mesh and 20 mesh in diameter, having hard, impact-formed, non-adherent surfaces and a compact, dense structure of pure carbon black particles built up systematically and progressively by application of turbulent pressure to flocculent carbon black, the particles being united only by their own cohesive force with sufficient tenacity of structure to resist disintegration when transported in bulk, and having an apparent density of more than 12 pounds per cubic foot.

6. A new product of manufacture, consisting of graphitized carbon black in the form of solid spherical granules between 300 mesh and 20 mesh in diameter and each having a smooth, impact-formed, non-adherent surface and a dense sturdy structure built up progressively and systematically by application of turbulent pressure to flocculent carbon black, and having an apparent density of more than 12 pounds per cubic foot.

7. A new product of manufacture, consisting of graphitized carbon black in the form of substantially spherical granules between 300 mesh and 20 mesh in diameter, and fragments of such spherical granules, said spherical granules having polished non-adherent surfaces, an apparent density of not less than 12 pounds per cubic foot and a compact dense internal structure of pure carbon black particles arranged systematically in forcible engagement with each other by turbulent pressure and maintained by their own cohesive force with such tenacity of structure as to withstand disintegration when transported in bulk.

8. The process of producing graphitized carbon black in the form of granules of sufficient density and cohesion to withstand handling in bulk without disintegration, which consists in subjecting flocculent carbon black of commerce in a dry state to turbulent agitation, continuing such agitation until said carbon black assumes the form of relatively tenacious, self-sustaining granules, and then subjecting said granules to a temperature of about 2000° C. for an interval of time sufficient to graphitize the material of the aggregates, meanwhile maintaining substantially unchanged the size and shape thereof.

9. The process of producing graphitized carbon black in substantially spherical grain form, which consists in maintaining dry particles of flocculent carbon black in a state approaching perfect turbulence, whereby the particles are freely subjected to symmetrical impact and caused to cohere to other granules and are thus built up progressively into relatively dustless, substantially spherical granules which in bulk have a low viscosity and an apparent density of over 20 pounds per cubic foot, and then subjecting such granules in mass to a temperature of about 2000° C. until the granules become graphitized.

10. The process of producing graphitized carbon black, which consists in first imparting dense, granular and tenacious characteristics to the light, fluffy carbon black of commerce by subjecting particles of the latter, in a dry state, to turbulent agitation, thus compacting the particles by impact and causing them to unite by impact-generated cohesion into granules of pure carbon black of sufficient density and cohesion to withstand handling in bulk without disintegration, and then heating the material so produced to graphitize it, while maintaining the size and shape of the granules substantially unchanged.

11. The process of making graphitized carbon black, which consists in converting dry flocculent carbon black into compact, substantially dustless aggregates of greater apparent density in bulk than flocculent carbon black and then subjecting the relatively dense aggregates in mass to a temperature of about 2000° C. for an interval of time sufficient to graphitize the material of the aggregates, meanwhile maintaining substantially unchanged the size or shape of the aggregates.

12. The process of making graphitized carbon black, which consists in first converting dry flocculent carbon black into dense, dustless granules, substantially spherical in shape and presenting non-adherent surfaces, and then subjecting such granules in mass to a temperature of about 2000° C. until the granules become graphitized.

13. The process of making graphitized carbon black, which consists in first subjecting dry flocculent carbon black to turbulent agitation in a dry state, causing the particles thereof to build up progressively and systematically by impact-generated cohesion into substantially spherical, dense granules and fragments thereof, and then heating the material so produced to graphitize it while maintaining the size and shape of the granules or fragments substantially unchanged.

14. The process of making graphitized carbon black, which consists in converting dry flocculent carbon black into compact, substantially dustless, granular aggregates of greater apparent density in bulk than the flocculent carbon black, and then heating said aggregates to graphitize them while maintaining the size and shape of the granular aggregate substantially unchanged.

15. A new product of manufacture, consisting of graphitized carbon black in the form of solid discrete granules between 300 mesh and 20 mesh in size and each having a smooth, non-adherent surface and sufficient density of structure to resist disintegration when transported in bulk and having an apparent density of more than twelve pounds per cubic foot.

HAROLD H. OFFUTT.